United States Patent
Zhang

(10) Patent No.: US 12,197,305 B2
(45) Date of Patent: Jan. 14, 2025

(54) TASK PUSH METHOD AND APPARATUS, AND ELECTRONIC DEVICE

(71) Applicant: HUAWEI TECHNOLOGIES CO., LTD., Shenzhen (CN)

(72) Inventor: Yanan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 18/003,879

(22) PCT Filed: Jun. 30, 2021

(86) PCT No.: PCT/CN2021/103468
§ 371 (c)(1),
(2) Date: Dec. 29, 2022

(87) PCT Pub. No.: WO2022/002115
PCT Pub. Date: Jan. 6, 2022

(65) Prior Publication Data
US 2023/0259439 A1    Aug. 17, 2023

(30) Foreign Application Priority Data

Jun. 30, 2020 (CN) .................. 202010623334.X
Jun. 29, 2021 (CN) .................. 202110726163.8

(51) Int. Cl.
*G06F 11/30* (2006.01)
*G06F 1/3215* (2019.01)
(Continued)

(52) U.S. Cl.
CPC .............. *G06F 11/3093* (2013.01)

(58) Field of Classification Search
CPC .............. G06F 9/4893; G06F 9/485
See application file for complete search history.

(56) References Cited

U.S. PATENT DOCUMENTS 11,995,303 B2 * 5/2024 Li ............... G06F 3/04817
2013/0252637 A1   9/2013 Cha et al.
(Continued)

FOREIGN PATENT DOCUMENTS

| CN | 107656770 A | 2/2018 |
| CN | 107690620 A | 2/2018 |

(Continued)

OTHER PUBLICATIONS

CN/20211076163.8, Office Action, Aug. 1, 2024.

*Primary Examiner* — Getente A Yimer
(74) *Attorney, Agent, or Firm* — Leydig, Voit & Mayer, Ltd.

(57) ABSTRACT

Embodiments of this application provide a task push method and apparatus, and an electronic device. The method includes: monitoring whether an external device is connected to a current device; when the external device is connected to the current device, determining whether a device usage habit description corresponding to the external device exists; and when the device usage habit description exists, generating a first task card display interface based on the device usage habit description, and displaying, on the current device, the first task card display interface or an interface used to enter the first task card display interface. Compared with the conventional technology, in the method in embodiments of this application, a procedure of using the external device is greatly simplified, complexity of a process of using the external device is reduced, and user experience is improved.

20 Claims, 13 Drawing Sheets

(51) Int. Cl.
    *G06F 1/3287*     (2019.01)
    *G06F 3/0482*     (2013.01)
    *G06F 3/04842*     (2022.01)
    *G06F 3/04883*     (2022.01)
    *G06F 9/451*     (2018.01)
    *G06F 21/32*     (2013.01)
    *G06F 21/62*     (2013.01)
    *H04M 1/60*     (2006.01)
    *H04M 1/72442*     (2021.01)
    *H04M 1/72454*     (2021.01)

(56) References Cited

U.S. PATENT DOCUMENTS

| | | | |
|---|---|---|---|
| 2016/0247246 A1* | 8/2016 | Bluestone | G06Q 50/265 |
| 2016/0357509 A1 | 12/2016 | Alsina et al. | |
| 2016/0357774 A1 | 12/2016 | Gauci et al. | |
| 2016/0360382 A1 | 12/2016 | Gross et al. | |
| 2017/0352008 A1* | 12/2017 | Gao | G06Q 10/1097 |
| 2018/0053094 A1* | 2/2018 | Patel | G06N 5/02 |
| 2019/0129615 A1* | 5/2019 | Sundar | G06F 9/451 |
| 2023/0022294 A1* | 1/2023 | Huang | G06F 9/5066 |

FOREIGN PATENT DOCUMENTS

| | | |
|---|---|---|
| CN | 109684524 A | 4/2019 |
| CN | 109829107 A | 5/2019 |
| CN | 110365721 A | 10/2019 |

* cited by examiner

TASK PUSH METHOD AND APPARATUS, AND ELECTRONIC DEVICE

CROSS-REFERENCE TO RELATED APPLICATIONS

This application is a national stage of International Application No. PCT/CN2021/103468, filed on Jun. 30, 2021, which claims priority to Chinese Patent Application No. 202110726163.8, filed on Jun. 29, 2021, and Chinese Patent Application No 202010623334.X, filed on Jun. 30, 2020. All of the aforementioned applications are hereby incorporated by reference in their entireties.

TECHNICAL FIELD

This application relates to the field of intelligent terminal technologies, and in particular, to a task push method and apparatus, and an electronic device.

BACKGROUND

In an application scenario of the conventional technology, when using an electronic device, a user often connects an external device to the electronic device that is currently being used, to extend a function of the electronic device. For example, the user connects a Bluetooth headset or a Bluetooth speaker to a mobile phone to achieve a better audio playback effect. For another example, the user connects a smart television to a mobile phone, so that a video played on the mobile phone is displayed on the smart television to achieve a better video display effect.

Usually, an operation procedure of using an external device by a user includes: establishing a connection between the external device and a current electronic device, for example, connecting to a Bluetooth headset through Bluetooth; opening, on the current electronic device, an application that uses the external device, for example, opening music playing software; and controlling the application to invoke the external device to perform a corresponding operation, for example, selecting a song and playing the song through the Bluetooth headset. In the foregoing procedure of using the external device, because a large quantity of applications are usually installed on the current electronic device, after connecting the external device to the current electronic device, the user needs to search for and open a target application, and then can smoothly use the external device only after controlling the target application. Complex operations greatly affect user experience, thereby reducing a frequency of using the external device by the user.

SUMMARY

To resolve a problem in the conventional technology that a process of using an external device is complex, this application provides a task push method and apparatus, and an electronic device, and this application further provides a computer-readable storage medium.

The following technical solutions are used in embodiments of this application.

According to a first aspect, this application provides a task push method, including:

monitoring whether an external device is connected to a current device;

when the external device is connected to the current device, determining whether a device usage habit description corresponding to the external device exists, where the device usage habit description is used to describe a usage habit of a user for the external device, and the device usage habit description includes one or more external device tasks corresponding to the external device and application scenario information corresponding to the external device task; and when the device usage habit description exists, generating a first task card display interface based on the device usage habit description, and displaying, on the current device, the first task card display interface or an interface used to enter the first task card display interface, where the first task card display interface is used to display a task card of a first external device task in the device usage habit description, where the first external device task is an external device task corresponding to application scenario information that has a highest degree of matching with application scenario information of a current application scenario; or the first task card display interface is used to display task cards of a plurality of external device tasks in the device usage habit description, where the plurality of task cards are sorted based on application scenario matching degrees corresponding to the task cards, and the application scenario matching degree is used to describe a matching degree between application scenario information of a current application scenario and the application scenario information in the device usage habit description.

In a feasible implementation of the first aspect, the method further includes:

when the device usage habit description does not exist, determining whether the current device has executed, within a preset historical time period, external device tasks corresponding to the external device; and when the current device has executed, within the preset historical time period, the external device tasks corresponding to the external device, generating a second task card display interface, and displaying, on the current device, the second task card display interface or an interface used to enter the second task card display interface, where the second task card display interface is used to display task cards of the external device tasks that correspond to the external device and that have been executed by the current device within the preset historical time period.

In a feasible implementation of the first aspect, in the second task card display interface, the task cards are sorted based on historical execution time and/or historical execution frequencies of the external device tasks corresponding to the task cards.

In a feasible implementation of the first aspect, the method further includes:

when the current device has not executed, within the preset historical time period, the external device tasks corresponding to the external device, generating a third task card display interface, and displaying, on the current device, the third task card display interface or an interface used to enter the third task card display interface, where the third task card display interface is used to display task cards of tasks of a same type as the external device tasks that correspond to the external device and that have been executed by the current device.

In a feasible implementation of the first aspect, in the third task card display interface, the task cards are sorted based on historical execution time and/or historical execution frequencies of the tasks of the same type as the external device tasks corresponding to the task cards.

In a feasible implementation of the first aspect, the external device tasks corresponding to the external device include:
invoking, by an application installed on the current device, a task executed by the external device; and/or
invoking, by an application installed on another device connected to the current device, a task executed by the external device.

In a feasible implementation of the first aspect, the displaying, on the current device, the task card display interface or an interface used to enter the task card display interface includes:
ending a screen-locked/screen-off state, and displaying the task card display interface on the current device, when the current device is in the screen-locked/screen-off state; and/or
displaying the interface on a current display interface of the current device when the current device is in an in-use state.

In a feasible implementation of the first aspect, the ending a screen-locked/screen-off state, and displaying the task card display interface on the current device, when the current device is in the screen-locked/screen-off state includes:
initiating user identity authentication; and
displaying the task card display interface on the current device when the user identity authentication succeeds.

In a feasible implementation of the first aspect, the displaying the interface on a current display interface of the current device when the current device is in an in-use state includes:
displaying, on the current display interface of the current device, a floating button used as the interface; and
displaying the task card display interface on the current device when the user taps the floating button.

In a feasible implementation of the first aspect, in the step of displaying, on the current device, the task card display interface or an interface used to enter the task card display interface, a display mode of the task card display interface includes:
a common display mode, where in the common display mode, display content of the task card display interface includes content related to personal information of the user; and
a privacy protection mode, where in the privacy protection mode, display content of the task card display interface does not include content related to personal information of the user.

In a feasible implementation of the first aspect,
the display mode of the task card display interface is preset on the current device; or
the display mode of the task card display interface corresponds to a user identity of a user who uses the current device.

According to a second aspect, an embodiment of this application provides a task push apparatus, including:
a monitoring module, configured to monitor whether an external device is connected to a current device;
a device usage habit description determining module, configured to: when the external device is connected to the current device, determine whether a device usage habit description corresponding to the external device exists, where the device usage habit description is used to describe a usage habit of a user for the external device, and the device usage habit description includes one or more external device tasks corresponding to the external device and application scenario information corresponding to each external device task; and
a task card display module, configured to: when the device usage habit description exists, generate a first task card display interface based on the device usage habit description, and display, on the current device, the first task card display interface or an interface used to enter the first task card display interface, where
the first task card display interface is used to display a task card of the external device task that is in the device usage habit description and that corresponds to application scenario information that has a highest degree of matching with application scenario information of a current application scenario; or
the first task card display interface is used to display task cards of a plurality of external device tasks in the device usage habit description, where the plurality of task cards are sorted based on application scenario matching degrees corresponding to the task cards, and the application scenario matching degree is used to describe a matching degree between application scenario information of a current application scenario and the application scenario information corresponding to the external device task in the device usage habit description.

According to a third aspect, this application provides an electronic device. The electronic device includes a memory configured to store computer program instructions and a processor configured to execute the program instructions, and when the computer program instructions are executed by the processor, the electronic device is triggered to perform the steps of the method according to embodiments of this application.

According to a fourth aspect, this application provides a computer-readable storage medium. The computer-readable storage medium stores a computer program, and when the computer program is run on a computer, the computer is enabled to perform the method according to embodiments of this application.

According to the foregoing technical solutions provided in embodiments of this application, at least the following technical effects can be achieved:

According to the method in embodiments of this application, when the external device is connected to the current device, a corresponding task card may be directly displayed to the user based on a task card display interface, and the user may directly use the task card to control the external device task or enter a control interface of the external device task by using the task card, to implement use of the external device. Compared with the conventional technology, in the method in embodiments of this application, a procedure of using the external device is greatly simplified, complexity of a process of using the external device is reduced, and user experience is improved. Further, according to the method in embodiments of this application, a corresponding task card display interface is generated based on the device usage habit of the user for the external device, to ensure that the task card displayed in the task card display interface conforms to the device usage habit of the user, so as to effectively improve user experience.

DESCRIPTION OF EMBODIMENTS

Figure 1:
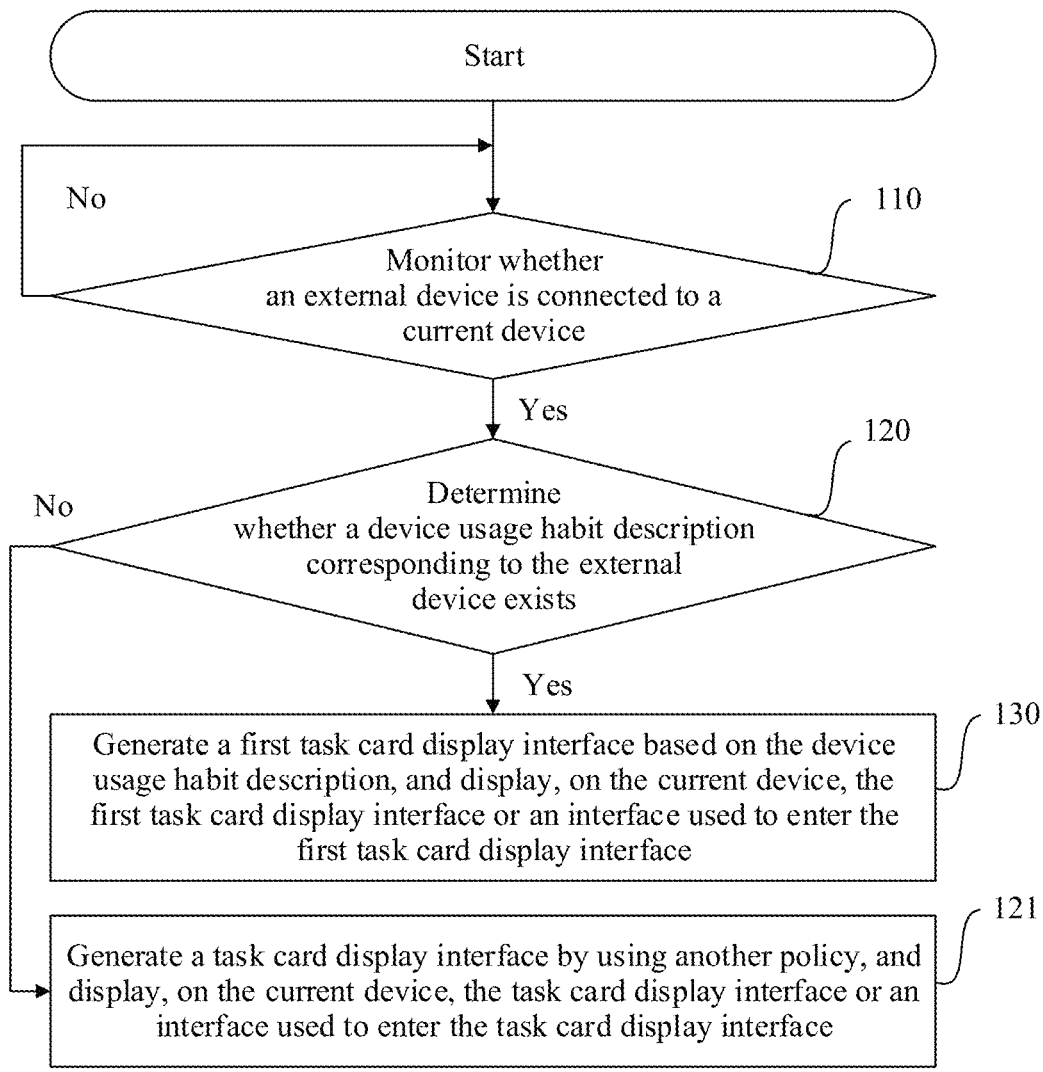
FIG. 1 is a flowchart of a task push method according to an embodiment of this application.

To make the objectives, technical solutions, and advantages of this application clearer, the following clearly and completely describes the technical solutions in this application with reference to specific embodiments and accompanying drawings in this application. It is clear that the described embodiments are merely some but not all of embodiments of this application. All other embodiments obtained by a person of ordinary skill in the art based on embodiments of this application without creative efforts shall fall within the protection scope of this application.

Terms used in implementations of this application are only used to explain specific embodiments of this application, and are not intended to limit this application.

To resolve a problem in the conventional technology that a process of using an external device is complex, this application provides a task push method. In an actual application scenario, a function that can be implemented by the external device may be expected. For example, a function that can be implemented by a Bluetooth headset is audio playing, a function that can be implemented by a smart television is video playing, and a function that can be implemented by a wireless camera is video collection. In this case, based on a specific external device, an application that can invoke the external device may be determined, and a task that can be executed by invoking the external device by the application may be further determined. In this way, when an external device is connected to a current electronic device, if a task that can be executed by invoking the external device by an application is pushed to a user, and the user directly determines, from the pushed task, a target task that needs to be executed, a process in which the user determines a target application from a plurality of applications, starts the target application and controls the target application to invoke the external device to execute the target task can be omitted, to greatly simplify the process of using the external device.

Further, in an embodiment of this application, task push is implemented based on a task card. The task card is used to provide a task control interface for controlling a task. For example, a task card for a Bluetooth headset includes song selection, play, pause, and stop control buttons. Alternatively, the task card provides an interface used to enter the task control interface. For example, a task card for a Bluetooth headset includes an introduction to a music playing task (for example, playing a song A), and a task control interface of the music playing task is displayed after the task card is tapped.

Specifically, when an external device is connected to a current device, a task card display interface and/or an interface used to enter the task card display interface are/is displayed on the current device.

The task card display interface is used to display a task card of an external device task.

The external device task is a task that is executed by invoking the external device by an application.

The task card is used to provide a task control interface for controlling the external device task, or provide an interface used to enter the task control interface.

Further, in an actual application scenario, there are usually a plurality of options for an external device task corresponding to a specific external device. For example, in an application scenario, an external device task corresponding to a Bluetooth headset includes: Play a song locally stored in a mobile phone by using the Bluetooth headset; play a song in the cloud by using the Bluetooth headset; play a radio broadcast by using the Bluetooth headset; play a video in the cloud, and play audio of the video by using the Bluetooth headset, make a call and play a voice of the other party by using the Bluetooth headset, and the like. If the task card display interface is used to display task cards of all external device tasks, not only a large quantity of data processing resources need to be occupied, but also a complex selection operation (for example, switch to a display page displaying a specific task card by sliding on the screen for a plurality of times) needs to be performed when the user selects a task that the user expects to execute. Therefore, in an embodiment of this application, the task card display interface does not display the task cards of all external device tasks, but displays only task cards of some external device tasks of all external device tasks, to control a quantity of task cards to be displayed in the task card display interface, reduce occupation of the data processing resources, and narrow a selection range of the user.

However, if the task card display interface displays only the task cards of some external device tasks of all external device tasks, a case in which a task card of a task that the user expects to execute is not displayed in the task card display interface easily occurs. To solve this problem, in an embodiment of this application, a screening mechanism is used to screen out an external device task with a high execution possibility, and a task card corresponding to the screened external device task is displayed in the task card display interface. In this way, not only the quantity of the task cards to be displayed in the task card display interface is controlled, the data processing resource occupation is reduced, and the selection range of the user is narrowed, but also the case in which the task card of the task that the user expects to execute is not displayed in the task card display interface can be effectively avoided.

Further, in an actual application scenario, the user has an external device usage habit for a specific external device. If an application scenario description when an external device is connected to a current device complies with a description of a habitual application scenario in which the user uses the external device, after the external device is connected to the current device, there is a high probability that the user executes a task corresponding to the device usage habit. For example, a user usually takes a subway from 8:00 a.m. to 9:00 a.m. every day on weekdays, and during this time period, the user is accustomed to playing music by using a headset. In this case, between 8:00 a.m. and 9:00 a.m. on a weekday, after the headset is connected to a mobile phone of the user, there is a high probability that the user subsequently performs a music playing task. If a task card of the music playing task is directly displayed to the user after the headset is connected to the mobile phone of the user, user experience can be greatly improved. Therefore, in an embodiment of this application, when an external device is connected to the current device, a task card to be displayed in the task card display interface is screened based on a device usage habit description of the user for the external device. Specifically, the device usage habit description is used to describe a usage habit of the user for a specific external device, and the device usage habit description includes one or more external device tasks corresponding to the external device and application scenario information corresponding to each external device task.

Further, in some actual application scenarios, when an external device is connected to a current device, a current application scenario may be completely consistent with an application scenario of a usage habit described in the device usage habit of the user. In this case, a task card corresponding to the usage habit that needs to be displayed to the user may be determined. However, in some application scenarios, when an external device is connected a current device, a current application scenario may be inconsistent with application scenarios of all usage habits described in the device usage habit of the user. Corresponding to the foregoing case, in an embodiment of this application, a task card to be displayed in the task card display interface is screened based on a degree of matching between a current application scenario and an application scenario in the device usage habit description.

The following describes the technical solutions provided in embodiments of this application in detail with reference to the accompanying drawings.

FIG. 1 is a flowchart of a task push method according to an embodiment of this application. In an embodiment of this application, as shown in FIG. 1, the following steps are performed in a task push process.

Step 110: Monitor whether an external device is connected to a current device.

Step 110 is returned when no external device is connected to the current device.

Step 120 is performed when the external device is connected to the current device.

Step 120: Determine whether a device usage habit description corresponding to the external device exists, where the device usage habit description is used to describe a usage habit of a user for the external device, and the device usage habit description includes one or more external device tasks corresponding to the external device and application scenario information corresponding to each external device task.

Step 121 is performed when the device usage habit description corresponding to the external device does not exist.

Step 121: Generate a task card display interface by using another policy, and display, on the current device, the task card display interface or an interface used to enter the task card display interface.

Step 130 is performed when the device usage habit description corresponding to the external device exists.

Step 130: Generate a first task card display interface based on the device usage habit description, and display, on the current device, the first task card display interface or an interface used to enter the first task card display interface.

Specifically, in an implementation of step 130, the first task card display interface is used to display a task card of the external device task that is in the device usage habit description and that corresponds to application scenario information that has a highest degree of matching with application scenario information of a current application scenario.

For example, in an application scenario, the device usage habit description of the user for a headset is as follows:
1. external device task 1: playing local music on a mobile phone by using the headset; application scenario information: weekdays+7:30 a.m.-8:30 a.m.+between XX Road and XX Road+take public transport;
2. external device task 2: playing broadcast music in the cloud by using the headset; application scenario information: weekdays+12:00 a.m.-13:30 a.m.+XXX location+office; and
3. external device task 3: playing a video in the cloud on the mobile phone and playing audio of the video by using the headset; application scenario information: weekdays+20:00 p.m.-22:30 p.m.+home.

It is assumed that at 7:00 a.m. on a weekday, when the user is between XX Road and XX Road by public transport, the user connects the Bluetooth headset to the mobile phone. Because the current application scenario completely matches the application scenario in the device usage habit description 1, according to the method in an embodiment of this application, the mobile phone displays a task card display interface to the user, and the task card display interface displays the external device task 1: a task card of playing the local music on the mobile phone by using the headset.

It is assumed that at 11:00 a.m. on a weekday, when the user is in an office at a location XXX, the user connects the Bluetooth headset to the mobile phone. Because the current application scenario has a highest degree of matching with the application scenario in the device usage habit description 2, according to the method in an embodiment of this application, the mobile phone displays a task card display interface to the user, and the task card display interface displays the external device task 2: a task card of playing the broadcast music in the cloud by using the headset.

Specifically, in an implementation of step 130, the first task card display interface is used to display task cards of a plurality of external device tasks in the device usage habit description. In an actual application scenario, limited by a size of the display interface, the task card display interface may not be able to display all task cards in one display page. Therefore, in an embodiment of this application, the task card display interface includes a plurality of display pages, only one or more task cards are displayed on each display page, and the user may switch the display page by performing a specific operation (for example, sliding a finger on the screen).

Further, in an application scenario in which the task card display interface includes the plurality of display pages, the user needs to perform a display page switching operation for a plurality of times to browse all task cards. To enable the user to select a required task card by performing as few times of page switching operations as possible, in an embodiment of this application, when the task cards are displayed by using the plurality of display pages, the display pages are sorted based on external device tasks corresponding to the task cards displayed on the display pages, and a display page corresponding to an external device task with a high probability of being executed is sorted in the front of the sequence as much as possible.

Specifically, in an implementation of step 130, the plurality of task cards displayed in the first task card display interface are sorted based on application scenario matching degrees corresponding to the task cards (that is, the display pages of the task cards are also sorted based on sorting of the task cards), and the application scenario matching degree is used to describe a matching degree between application scenario information of a current application scenario and the application scenario information corresponding to the external device task in the device usage habit description.

Specifically, in an embodiment of this application, different weights are set for different types of application scenario information (for example, a date, a time period, a geographical location, and user behavior) of an application scenario, matching and comparison are separately performed on the different types of application scenario information, and weighting calculation is performed based on a comprehensive comparison result to obtain application scenario matching degrees of the application scenario information.

The application scenario based on the device usage habit descriptions 1 to 3 is used as an example.

It is assumed that at 12:00 a.m. on a weekday, when the user is at home, the user connects the Bluetooth headset to the mobile phone. According to the method in an embodiment of this application, the mobile phone displays a task card display interface to the user, and the task card display interface displays three task cards of the external device tasks 1 to 3. The three task cards are sorted in the following sequence: the external device task 3, the external device task 2, and the external device task 1.

Further, in an implementation of step 130, the first task card display interface is used to display the task cards of the plurality of external device tasks in the device usage habit description. The external device tasks corresponding to the displayed task cards are external device tasks screened from the external device tasks in the device usage habit description based on the application scenario matching degrees. For example, the first task card display interface is preset to display n task cards. When a quantity of the external device tasks in the device usage habit description is greater than n, n external device tasks whose application scenario matching degrees rank top n are screened from the external device tasks in the device usage habit description, and task cards of the screened n external device tasks are displayed in the first task card display interface.

According to the method in this embodiment of this application, when the external device is connected to the current device, a corresponding task card may be directly displayed to the user based on a task card display interface, and the user may directly use the task card to control the external device task or enter a control interface of the external device task by using the task card, to implement use of the external device. Compared with the conventional technology, in the method in this embodiment of this application, a procedure of using the external device is greatly simplified, complexity of a process of using the external device is reduced, and user experience is improved. Further, according to the method in this embodiment of this application, a corresponding task card display interface is generated based on the device usage habit of the user for the external device, to ensure that the task card displayed in the task card display interface conforms to the device usage habit of the user, so as to effectively improve user experience.

It should be noted herein that, in this embodiment of this application, different external device tasks may be tasks executed by different applications, for example, a music playing task executed by a music playing application, a video playing task executed by a video playing application, or a dialing task executed by a voice call application. Further, different external device tasks may also be tasks executed by a same application for different target objects or when different running parameters are used, for example, a music playing task of playing a local song 1 executed by a music playing application, a music playing task of playing a local song 2 executed by the music playing application, and a music playing task of playing a song 3 in the cloud executed by the music playing application.

Further, in an actual application scenario, the external device connected to the current device may be any type of electronic device, for example, a wireless headset, a wired headset, a microphone, a smart speaker, a smart screen, a tablet computer, a mobile phone, a notebook computer, a smart watch, or a smart band.

Further, in an embodiment of this application, when there is no device usage habit description for the external device currently connected to the current device, the task card displayed in the task card display interface is determined based on a historical usage record of the external device connected to the current device.

Specifically, in an implementation of step 121, a task card display interface is generated based on the historical usage record of the external device connected to the current device and the task card display interface and/or an interface used to enter the task card display interface are/is displayed on the current device.

Figure 2:
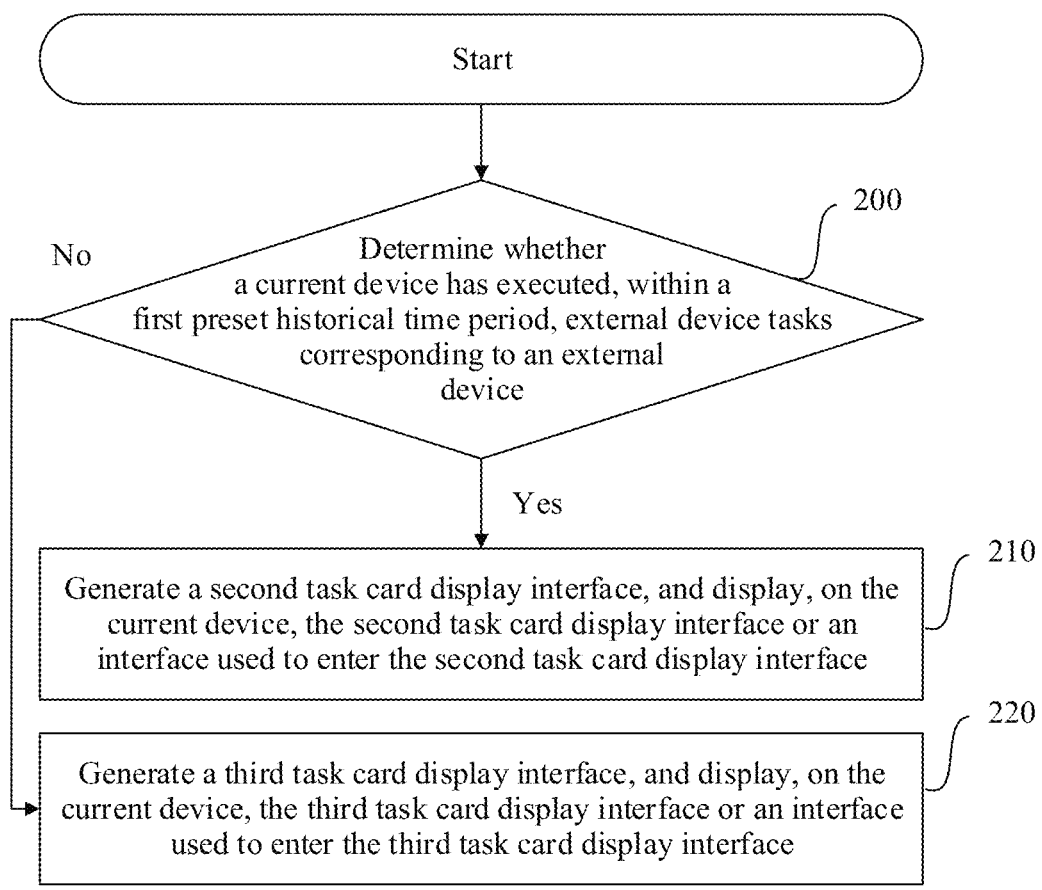
FIG. 2 is a partial flowchart of a task push method according to an embodiment of this application.

FIG. 2 is a partial flowchart of a task push method according to an embodiment of this application. In an embodiment of this application, when there is no device usage habit description for the external device currently connected to the current device, in an implementation of step 121, the following steps shown in FIG. 2 are performed.

Step 200: Determine whether the current device has executed, within a preset historical time period, external device tasks corresponding to the external device.

Step 210 is performed when the current device has executed, within the preset historical time period, the external device tasks corresponding to the external device.

Step 210: Generate a second task card display interface, and display, on the current device, the second task card display interface or an interface used to enter the second task card display interface.

The second task card display interface is used to display task cards of the external device tasks that correspond to the external device and that have been executed by the current device within the preset historical time period.

For example, in an application scenario of a mobile phone, the following external device tasks for a headset exist: A music playing application invokes the headset to play a song 1. The music playing application invokes the headset to play a song 2. The music playing application invokes the headset to play a song 3. A video playing application invokes the headset to play a video 1. The video playing application invokes the headset to play a video 2. A voice call application invokes the headset to make a voice call. If there is no device usage habit description for the headset, when the headset is connected to the mobile phone, historical task execution time of the external device tasks for the headset is determined by querying a historical record. It is assumed that an execution time at which the music playing application invokes the headset to play the song 1 is one hour ago, an execution time at which the music playing application invokes the headset to play the song 2 is 20 minutes ago, an execution time at which the music playing application invokes the headset to play the song 3 is one day ago, an execution time at which the video playing application invokes the headset to play the video 1 is two hours ago, an execution time at which the video playing application invokes the headset to play the video 2 is two days ago, and an execution time at which the voice call application invokes the headset to make the voice call is 10 minutes ago. If the preset historical time period is a current day, when the headset is connected to the mobile phone, tasks corresponding to four task cards displayed in the task card display interface are respectively as follows: The music playing application invokes the headset to play the song 1. The music playing application invokes the headset to play the song 2. The video playing application invokes the headset to play the video 1. The voice call application invokes the headset to make the voice call.

Further, in an actual application scenario, on the premise that the external device is not invoked, a similar effect of the external device tasks may be implemented by executing tasks of a same type as the external device tasks. For example, in an application scenario of a mobile phone, the mobile phone performs music playing based on an externally connected headset, or the mobile phone may perform the music playing based on a built-in speaker of the mobile phone. Therefore, in an embodiment of this application, when the current device has not executed, within the preset historical time period, the external device tasks corresponding to the external device, a task card display interface is generated based on the tasks of the same type as the external device tasks. Specifically, in an implementation of step 121, as shown in FIG. 2, details are as follows:

Step 220 is performed when the current device has not executed, within the preset historical time period, the external device tasks corresponding to the external device.

Step 220: Generate a third task card display interface, and display, on the current device, the third task card display interface or an interface used to enter the third task card display interface.

The third task card display interface is used to display task cards of the tasks of the same type as the external device tasks that correspond to the external device and that have been executed by the current device.

For example, in an application scenario of a mobile phone, the following external device tasks for a headset exist: A music playing application invokes the headset to play a song 1. The music playing application invokes the headset to play a song 2. The music playing application invokes the headset to play a song 3. A video playing application invokes the headset to play a video 1. The video playing application invokes the headset to play a video 2. A voice call application invokes the headset to make a voice call. When the headset is connected to the mobile phone, it is determined, by querying a historical record, that latest execution time of the foregoing external device tasks is one day ago. In addition, it is assumed that an execution time at which the music playing application invokes the mobile phone speaker to play the song 1 is one hour ago, an execution time at which the music playing application invokes the mobile phone speaker to play the song 2 is 20 minutes ago, an execution time at which the music playing application invokes the mobile phone speaker to play the song 3 is one day ago, an execution time at which the video playing application invokes the mobile phone speaker to play the video 1 is two hours ago, an execution time at which the video playing application invokes the mobile phone speaker to play the video 2 is two days ago, and an execution time at which the voice call application invokes the mobile phone speaker to make the voice call is 10 minutes ago.

If the preset historical time period is a current day, when the headset is connected to the mobile phone, tasks corresponding to four task cards displayed in the task card display interface are respectively as follows: The music playing application invokes the headset to play the song 1. The music playing application invokes the headset to play the song 2. The video playing application invokes the headset to play the video 1. The voice call application invokes the headset to make the voice call.

Further, in an implementation of step 210, in the task card display interface, the task cards are sorted based on historical execution time and/or historical execution frequencies of the external device tasks corresponding to the task cards. For example, the closer the historical execution time is to a current moment, the higher a ranking; or the higher the historical execution frequency, the higher the ranking.

Further, in an implementation of step 220, in the task card display interface, the task cards are sorted based on historical execution time and/or historical execution frequencies of the tasks of the same type as the external device tasks corresponding to the task cards. For example, the closer the historical execution time is to a current moment, the higher a ranking; or the higher the historical execution frequency, the higher the ranking.

Further, in an actual application scenario, when the external device is connected to the current device, the current device may be in a screen-locked/screen-off state. In an embodiment of this application, in a process of displaying, on the current device, the task card display interface and/or the interface used to enter the task card display interface, when the current device is in the screen-locked/screen-off state, the screen-locked/screen-off state is ended, and the task card display interface is displayed on the current device.

Further, in an embodiment of this application, the external device task includes: an application installed on the current device invokes a task executed by the external device. For example, when the external device is a headset and the current device is a mobile phone, the external device task may be a music playing task executed by an audio playing application on the mobile phone by using the headset, or the external device task may be a voice/video call task executed by a call application on the mobile phone by using the headset.

Figure 3A:
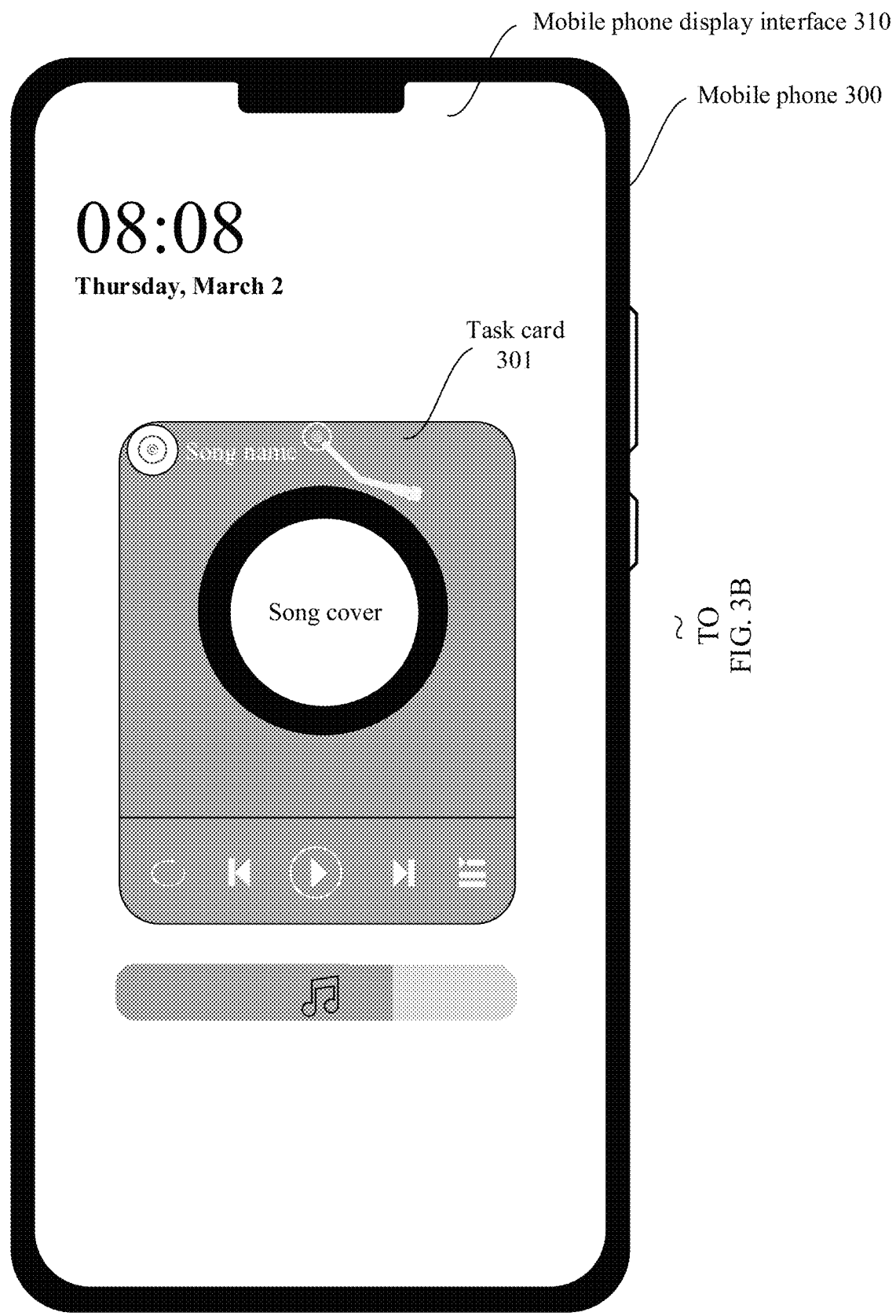
FIG. 3A and FIG. 3B are a diagram of an application scenario according to an embodiment of this application.
Figure 3B:
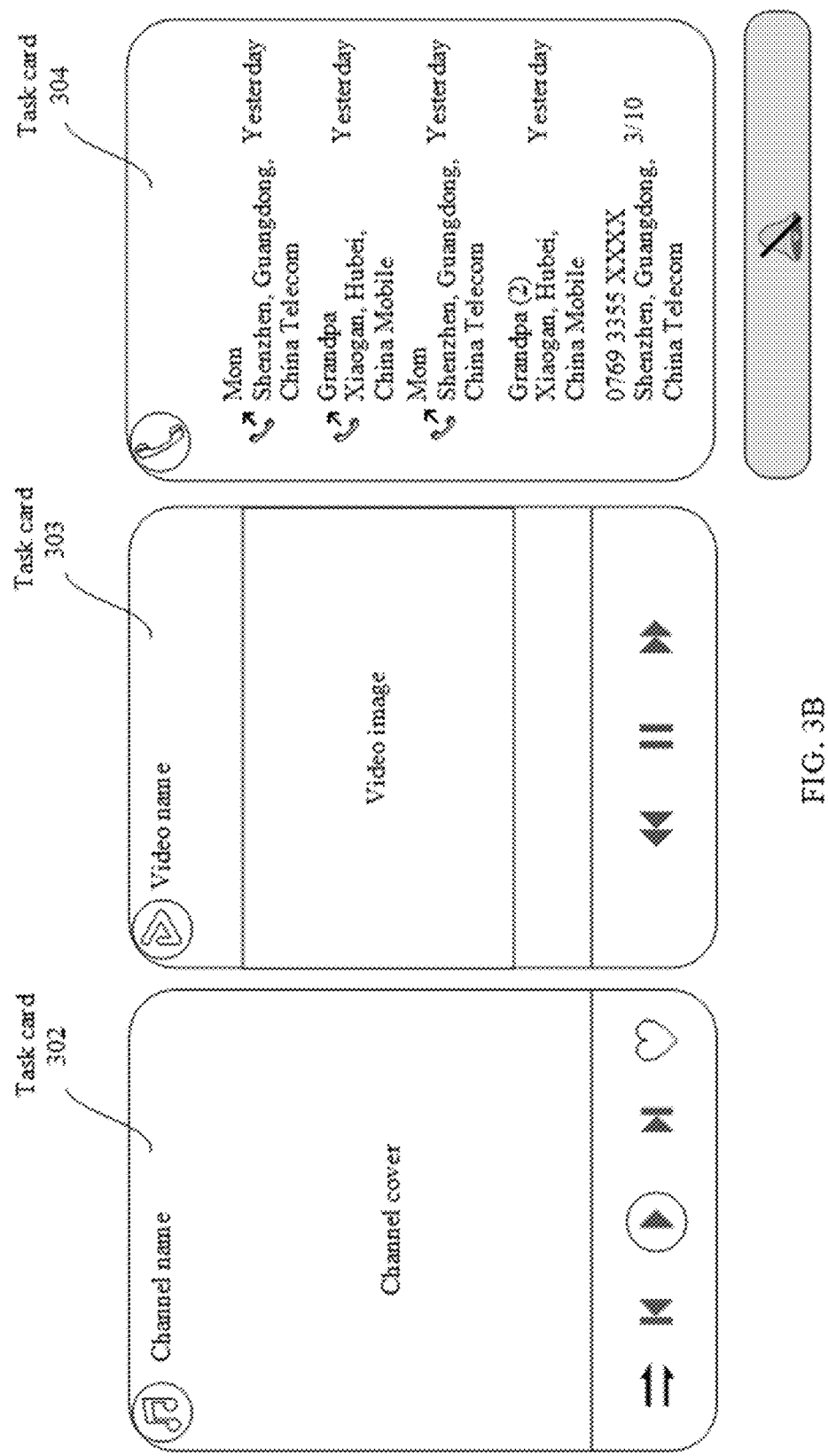

FIG. 3A and FIG. 3B are a diagram of an application scenario according to an embodiment of this application. In an embodiment of this application, as shown in FIG. 3A and FIG. 3B, a current device is a mobile phone 300. When a headset is connected to the mobile phone, functions that can be implemented by the mobile phone include: A music playing application invokes the headset to play a local song. A broadcast listening application invokes the headset to play a broadcast song in the cloud. A video playing application plays a local video and invokes the headset to play audio of the video when the video is played. A voice call application invokes the headset to make a voice call. In this case, when the headset is connected to the mobile phone, task cards that can be displayed for the connected headset include task cards 301, 302, 303, and 304. The task card 301 provides a play control interface for playing the local song by the music playing application, the task card 302 provides a play control interface for playing the broadcast song in the cloud by the broadcast listening application, the task card 303 provides a play control interface for playing the local video by the video playing application, and the task card 304 provides a control interface for voice dialing. Further, in an application scenario, the task card 301 to the task card 304 may also separately provide play control interfaces for playing different local songs by the music playing application.

When the mobile phone is in a screen-locked/screen-off state, when the headset is connected to the mobile phone, the mobile phone screen of the mobile phone 300 displays a mobile phone display interface 310 shown in FIG. 3A and FIG. 3B, and displays a task card display interface in the mobile phone display interface 310. The task card display interface displays one of the task cards 301, 302, 303, and 304, and a user may switch between different task cards by sliding in the task card display interface. The user directly performs task control by directly tapping a control button of a task card displayed in the task card display interface.

Further, in an embodiment of this application, an external device task may also be a task that can be executed by a device connected to the current device. For example, when an external device is a headset, the current device is a mobile phone, and the current device task establishes a connection to a smart television, the external device task may be a video playing task that can be executed by a video playing application on the smart television, and the video playing task performs audio playing by using the headset. Specifically, the external device task includes: An application installed on another device connected to the current device invokes a task executed by the external device.

Figure 4A:
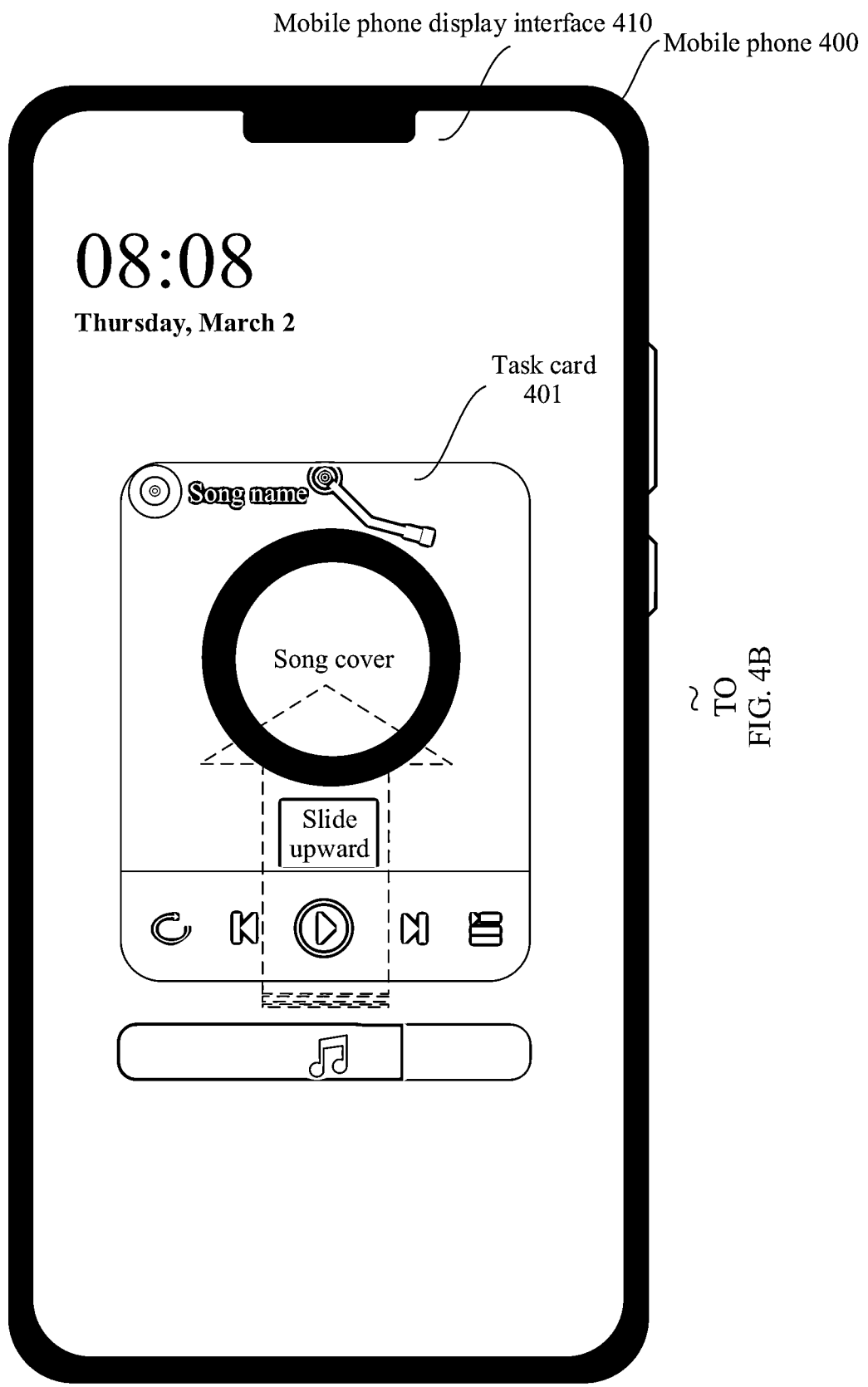
FIG. 4A to FIG. 4C are a diagram of an application scenario according to an embodiment of this application.
Figure 4B:
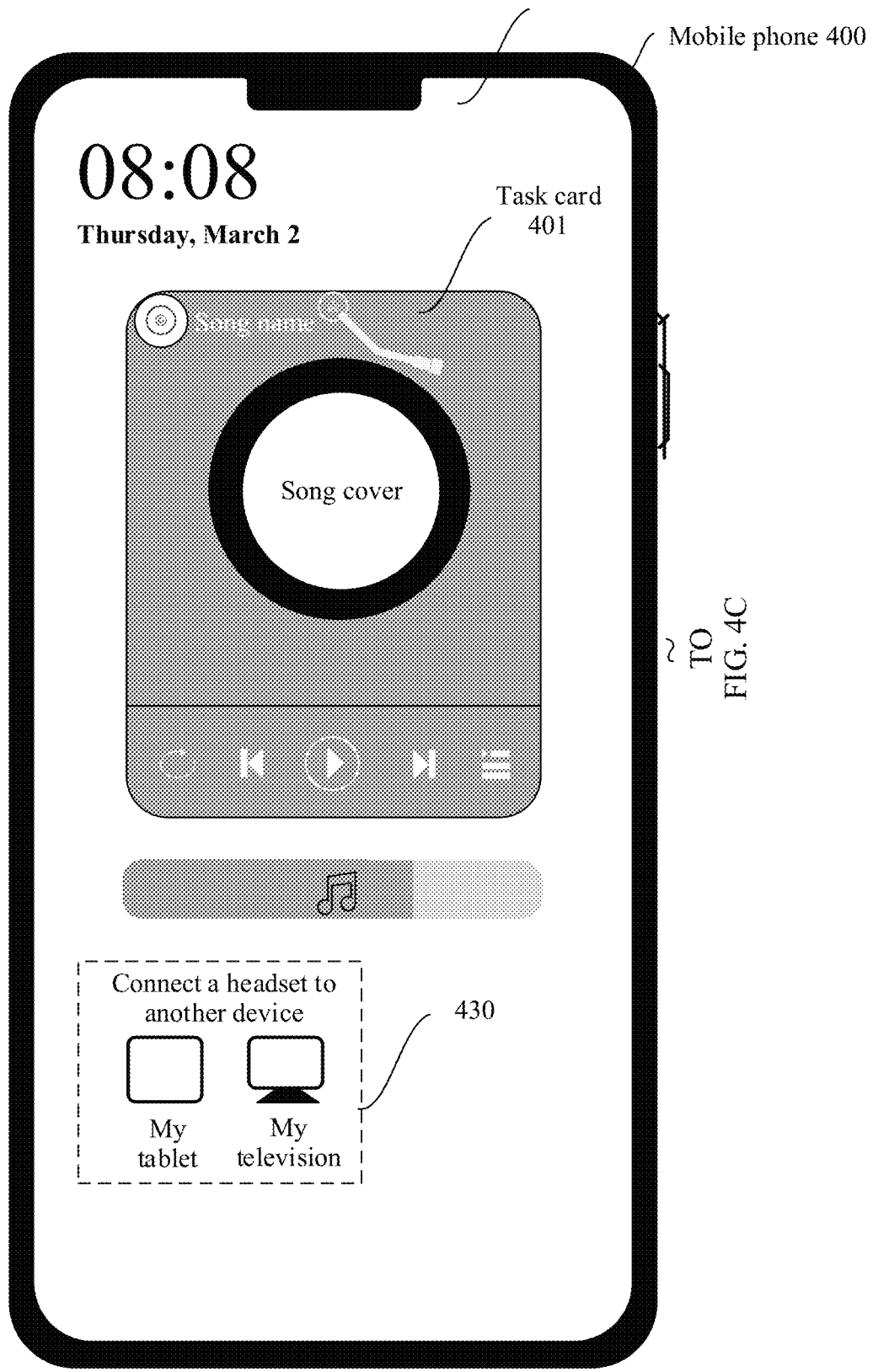
Figure 4C:
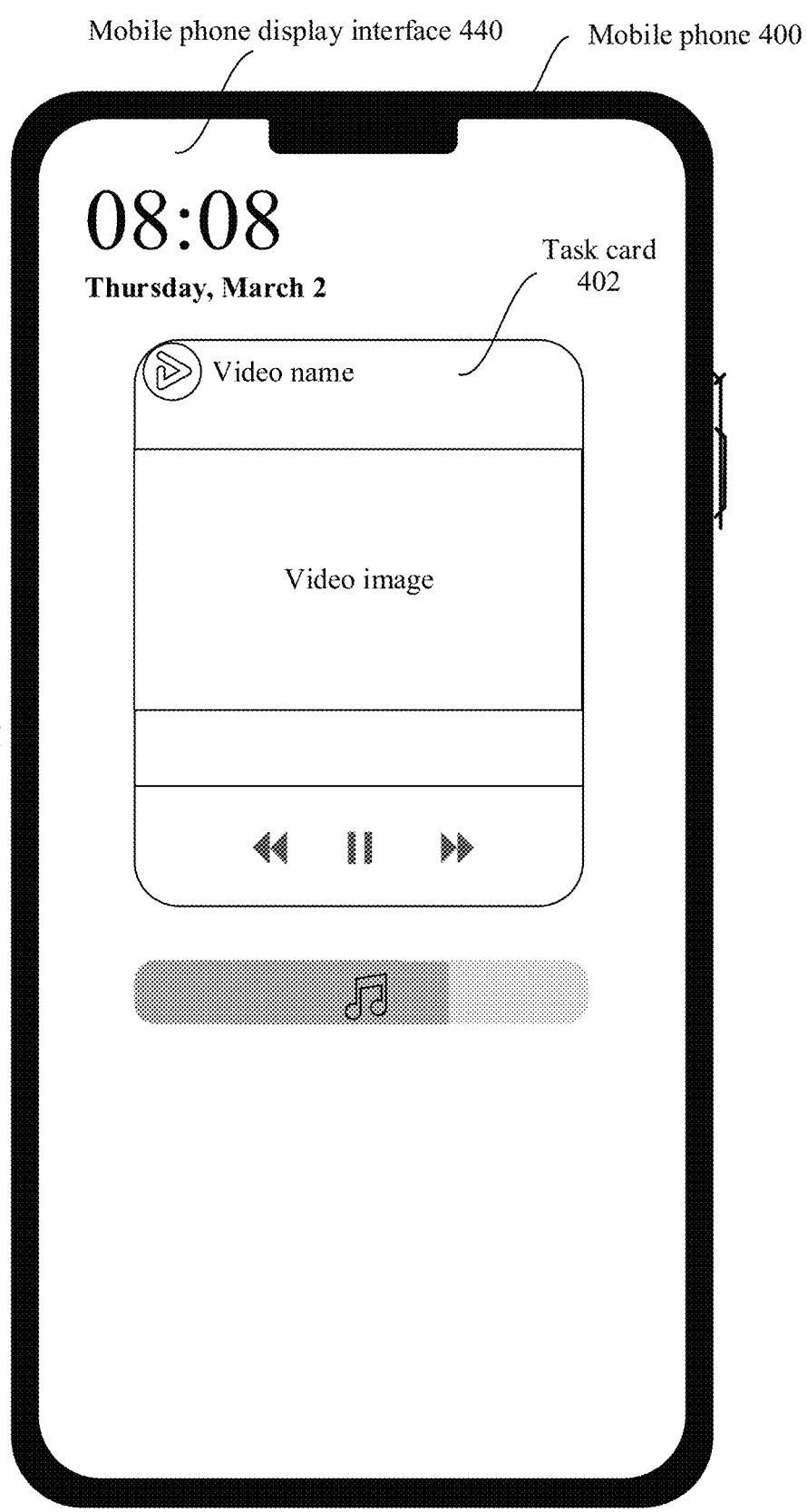

FIG. 4A to FIG. 4C are a diagram of an application scenario according to an embodiment of this application. In an embodiment of this application, as shown in FIG. 4A to FIG. 4C, a current device is a mobile phone 400, and the mobile phone is connected to a smart television and a tablet computer. When the mobile phone is in a screen-locked/screen-off state, and when a headset is connected to the mobile phone, a mobile phone display interface 410 is displayed on the screen of the mobile phone 400, and a task card display interface is displayed in the mobile phone display interface 410. A task card 401 is displayed in the task card display interface displayed in the mobile phone display interface 410, and the task card 401 provides a play control interface for playing a local song by a music playing application on the mobile phone.

A slide up operation is performed in the mobile phone display interface 410, and a mobile phone display interface 420 is displayed on the screen of the mobile phone 400. The task card display interface is displayed in the mobile phone display interface 420, and the mobile phone display interface 420 displays the task card 401 displayed in the task card display interface and a selection interface 430 of another device connected to the mobile phone 400. Buttons corresponding to the tablet computer and the smart television are displayed in the selection interface 430.

The smart television button is selected in the selection interface 430, and the screen of the mobile phone 400 displays a mobile phone display interface 440. The task card display interface is displayed in the mobile phone display interface 440, the mobile phone display interface 440 displays a task card 402 displayed in the task card display interface, and the task card 402 provides a play control interface for playing a video by a video playing application on the smart television. A user of the mobile phone may directly control, by directly tapping a control button of the task card 402, the smart television to execute a video playing task. In a process of executing the video playing task, the user plays audio by using the headset connected to the mobile phone.

Further, to prevent an unauthorized user from using the device, in an embodiment of this application, in the screen-locked/screen-off state, when an external device is connected to the current device, user identity authentication needs to be performed, and only a user whose identity authentication succeeds can view the task card display interface and further perform an operation on the task card.

Specifically, in an embodiment of this application, when the current device is in the screen-locked/screen-off state, a process of displaying the task card display interface on the current device includes the following steps.

Initiate user identity authentication; and display the task card display interface on the current device when the user identity authentication succeeds.

Specifically, in an embodiment of this application, when the screen of the current device is locked and off, the screen of the current device is turned on and the user identity authentication is initiated. When the user identity authentication succeeds, the current device is unlocked and the task card display interface is displayed on the current device.

Further, in an actual application scenario, when the external device is connected to the current device, the current device may also be in an in-use state. In the in-use state, the user may be interacting with the current device, and sudden display of the task card will interrupt the ongoing interaction operation of the user. Therefore, in an embodiment of this application, in a process of displaying, on the current device, the task card display interface and/or an interface used to enter the task card display interface, when the current device is in the in-use state, the interface used to enter the task card display interface is displayed on a current display interface of the current device.

Specifically, in an embodiment of this application, when the current device is in the in-used state, a process of displaying the interface used to enter the task card display interface on the current device includes the following steps:

displaying, on the current display interface of the current device, a floating button used as the interface; and displaying the task card display interface on the current device when the user taps the floating button.

Figure 5:
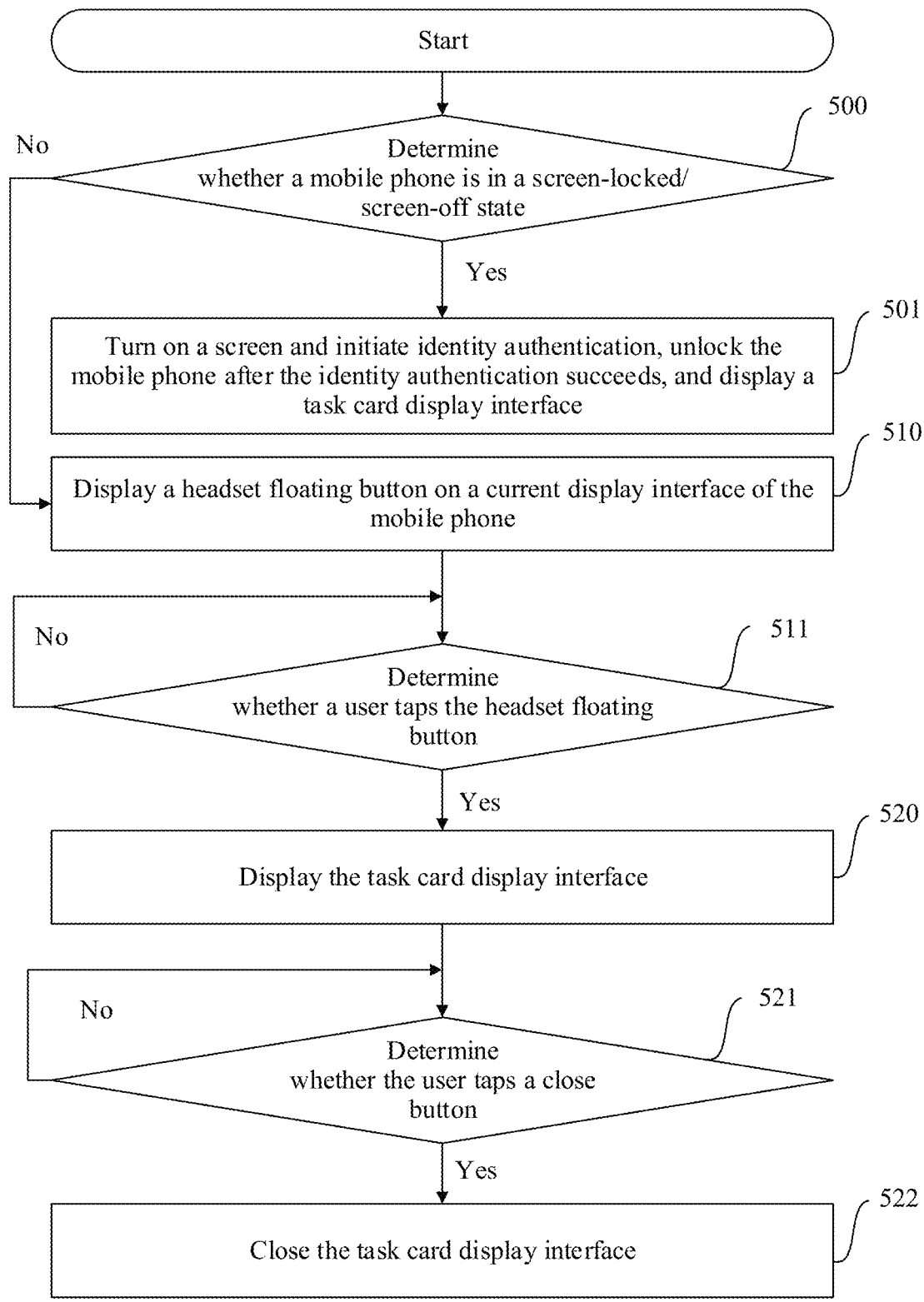
FIG. 5 is a partial flowchart of a task push method according to an embodiment of this application.

FIG. 5 is a partial flowchart of a task push method according to an embodiment of this application. Specifically, in an application scenario, a process of displaying, on a mobile phone, a task card display interface or an interface used to enter the task card display interface is shown in FIG. 5.

Step 500: Determine whether the mobile phone is in a screen-locked/screen-off state.

Step 501 is performed when the mobile phone is in the screen-locked/screen-off state.

Step 501: Turn on a screen and initiate user identity authentication, unlock the mobile phone after the identity authentication succeeds, and display a task card display interface.

Step 510 is performed when the mobile phone is not in the screen-locked/screen-off state.

Step 510: Display a headset floating button on a current display interface of the mobile phone.

Step 511: Determine whether a user taps the headset floating button.

Step 512: Perform step 520 when the user taps the headset floating button.

Step 520: Display the task card display interface.

Step 521: Determine whether the user taps a close button.

Step 514 is performed when the user taps the close button.

Step 522: Close the task card display interface.

Figure 6A:
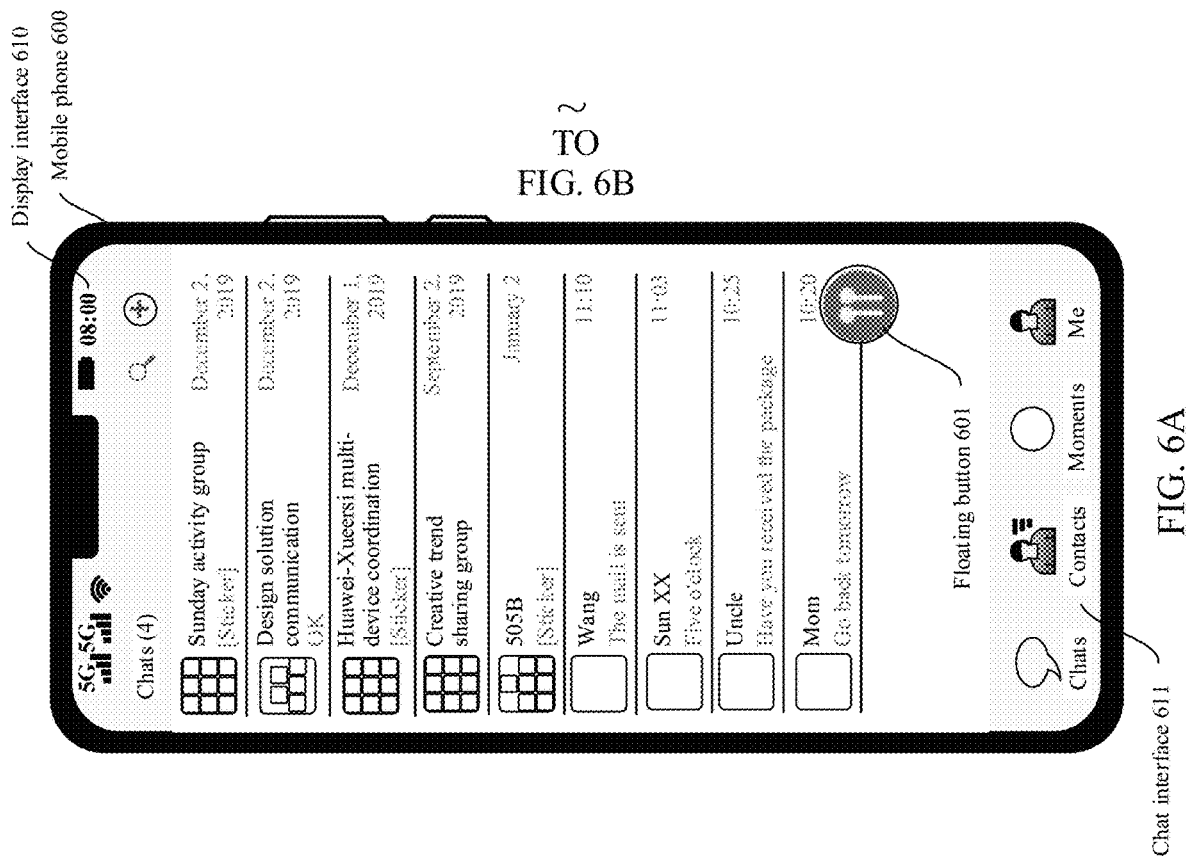
FIG. 6A and FIG. 6B are a diagram of an application scenario according to an embodiment of this application.
Figure 6B:
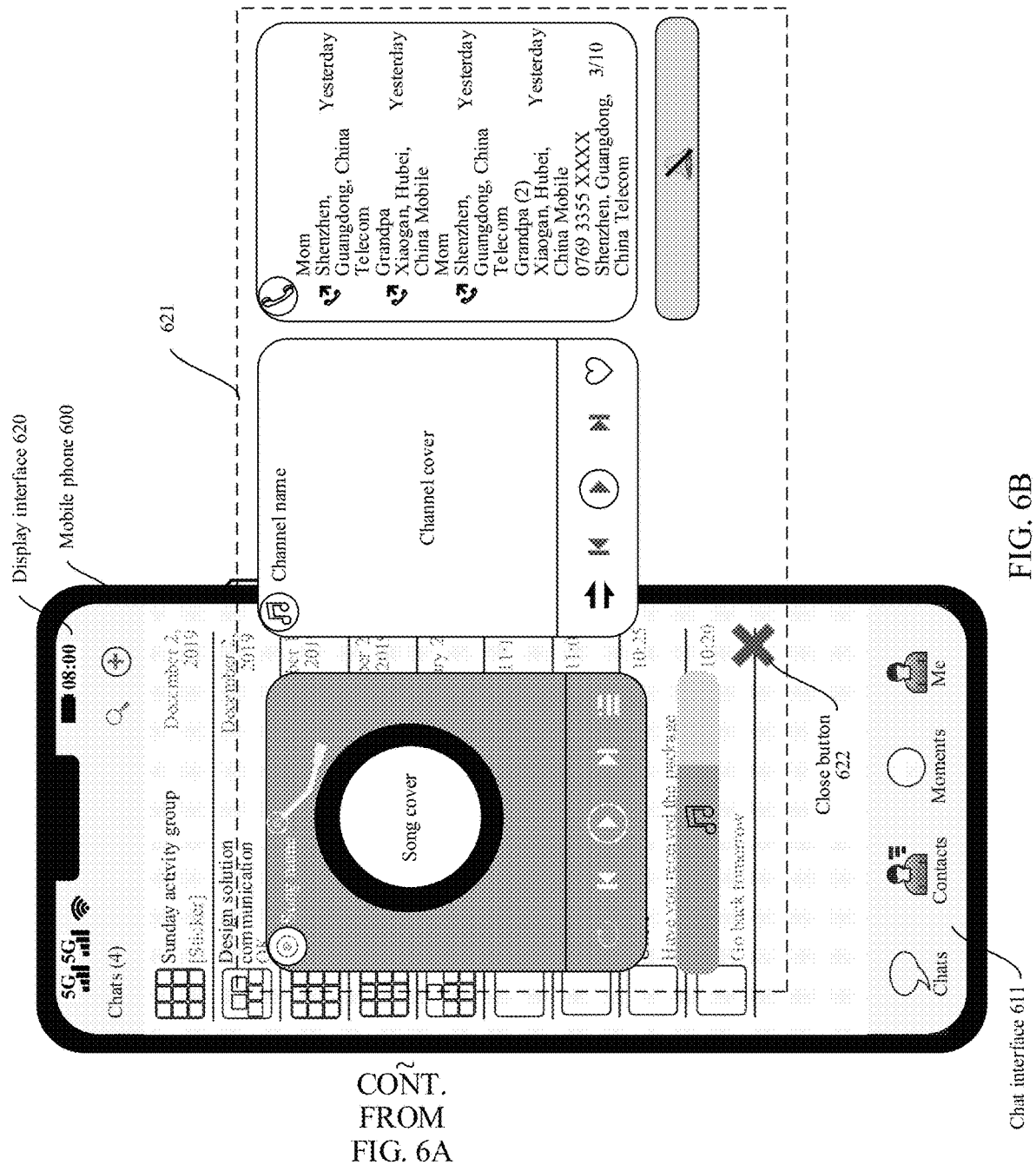

FIG. 6A and FIG. 6B are a diagram of an application scenario according to an embodiment of this application. In an embodiment of this application, as shown in FIG. 6A and FIG. 6B, a current device is a mobile phone 600. When the mobile phone 600 is in an in-use state (for example, a user is chatting in text), the screen of the mobile phone 600 displays a display interface 610, and the display interface 610 displays a chat interface 611.

When a headset is connected to the mobile phone, a floating button 601 (an interface for entering a task card display interface) is displayed in the chat interface 611.

When the user taps the floating button 601, the screen of the mobile phone 600 displays a display interface 620, the display interface 620 displays a task card display interface 621, and the task card display interface 621 displays one of task cards 601, 602, and 603. The user may switch, by sliding on the screen, the task cards displayed in the task card display interface 621.

Further, the task card display interface 621 further displays a close button 622. When the user taps the close button 622, the task card display interface 621 is closed.

Further, to protect user privacy, in an embodiment of this application, a display mode of the task card display interface includes a common display mode and a privacy protection mode. Content that is displayed in the task card display interface and that corresponds to different display modes is different. Specifically, in the common display mode, display content of the task card display interface includes content related to personal information of the user; and in the privacy protection mode, display content of the task card display interface does not include content related to personal information of the user. For example, in the common display mode, a task card that is for a music playing task and that is displayed in the task card display interface includes a specific music name and a music label picture. The music name and the music label picture may reflect that the user played the music and/or the music is stored in the current device, so that the task card displays the personal information of the user. Therefore, in the privacy protection mode, the task card that is for the music playing task and that is displayed in the task card display interface does not include the specific music name and the music label picture. In this way, the personal information of the user is not displayed on the task card.

For example, in an application scenario, in the common display mode, a task card display manner is shown in FIG. 3A and FIG. 3B. A name and a cover of music played by the music playing application are displayed in the task card 301, a name and a cover of a broadcast song in the cloud played by the broadcast listening application are displayed in the task card 302, a screenshot of a video played by the video playing application is displayed in the task card 303, and a name of a dialing object of the dialing application is displayed in the task card 304.

Figure 7A:
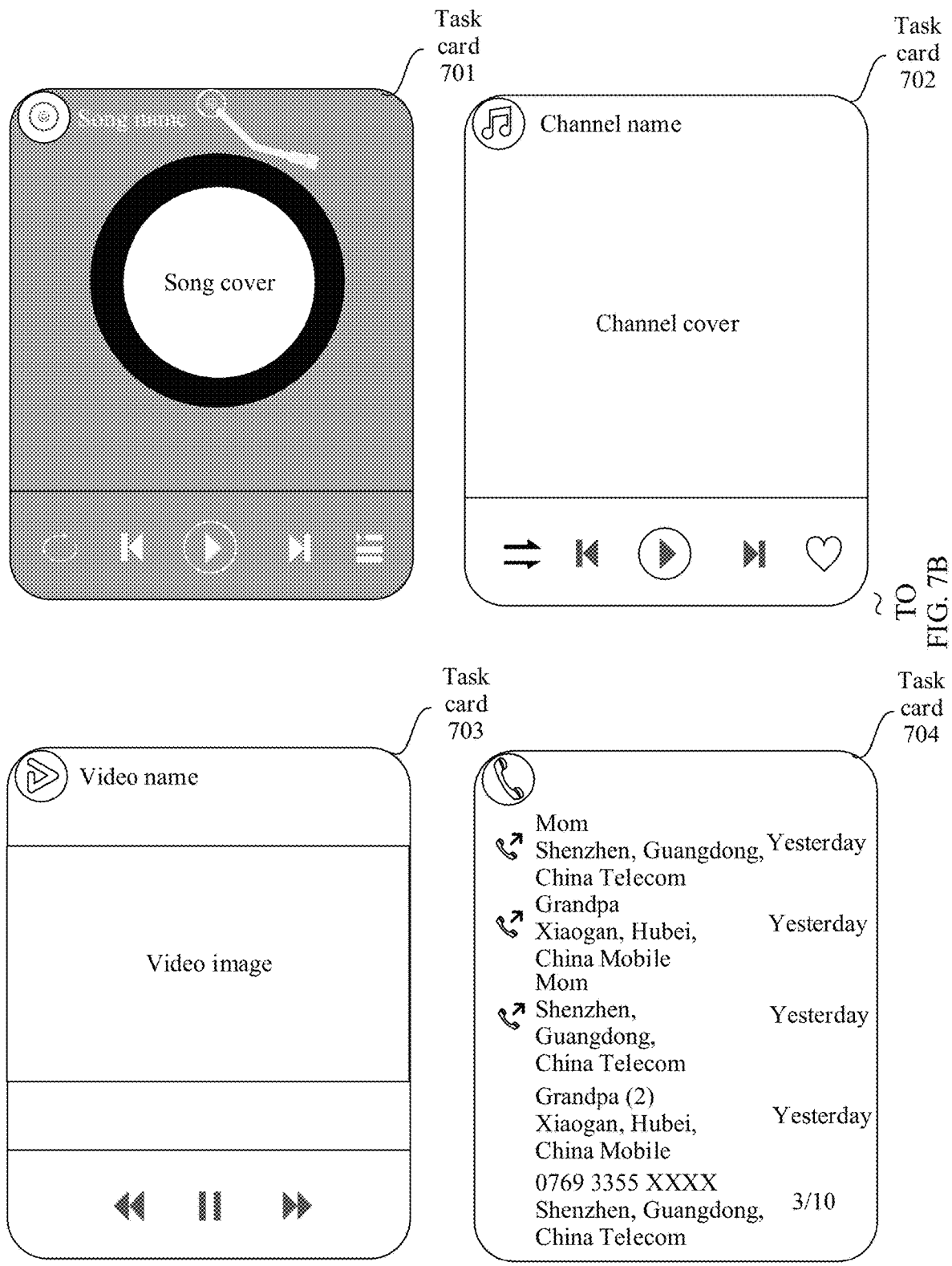
FIG. 7A and FIG. 7B are a diagram of an application scenario according to an embodiment of this application.
Figure 7B:
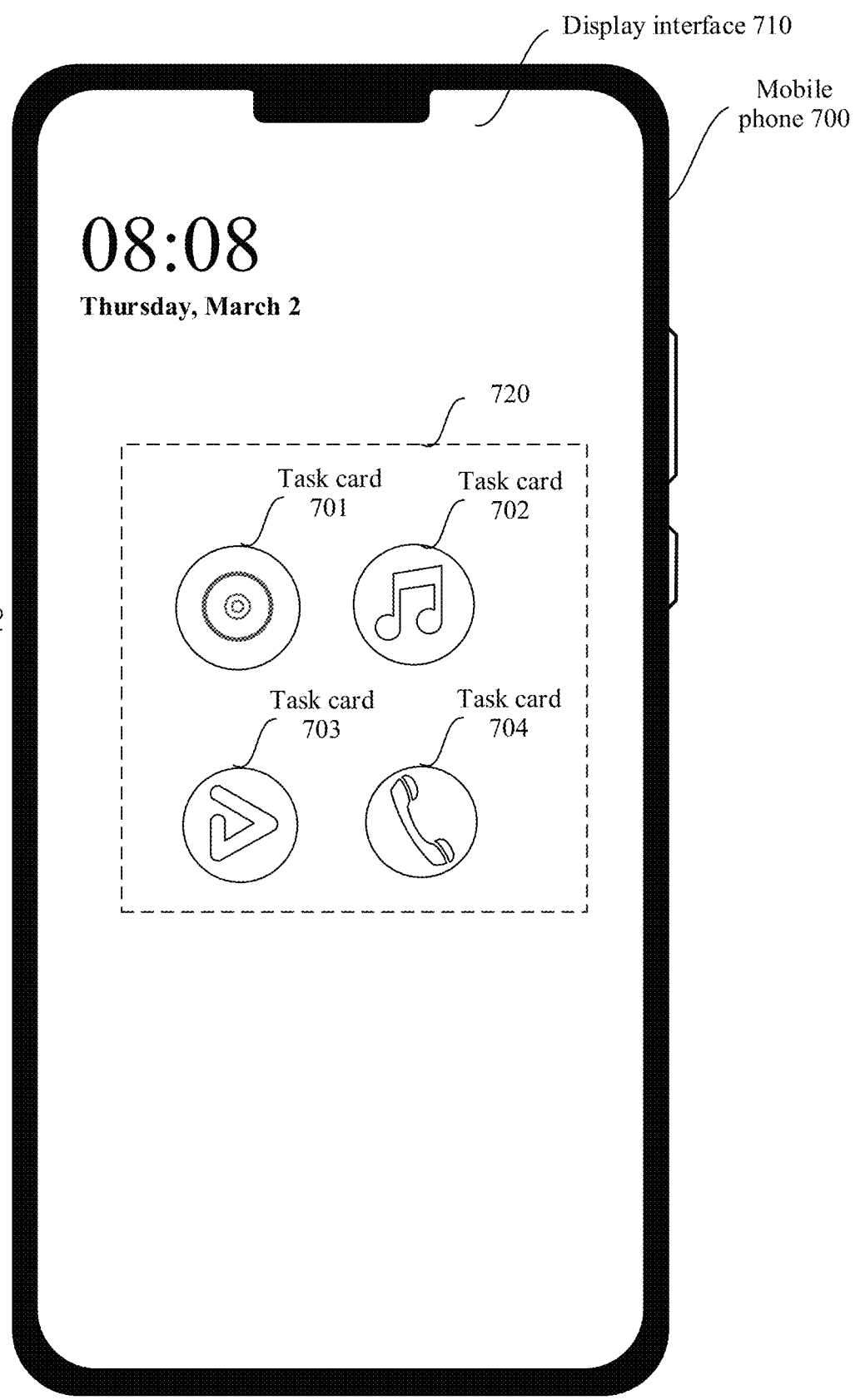

FIG. 7A and FIG. 7B are a diagram of an application scenario according to an embodiment of this application. In a privacy protection mode, a task card display manner is shown in FIG. 7A and FIG. 7B. The screen of a mobile phone 700 displays a display interface 710, the display interface 710 displays a task card display interface 720, and the task card display interface 720 displays a task card 701, a task card 702, a task card 703, and a task card 704. An icon of a music playing application is displayed in the task card 701, an icon of a broadcast listening application is displayed in the task card 702; an icon of a video playing application is displayed in the task card 7032; and an icon of a dialing application is displayed in the task card 704.

Further, in an embodiment of this application, a display mode of the task card display interface is preset on a current device.

Further, in an embodiment of this application, the display mode of the task card display interface corresponds to a user identity of a user who uses the current device.

For example, in an application scenario, a user A purchases a membership privilege, and initiates user identity authentication before the task card display interface is displayed. When it is authenticated that a current user is the user A, the task card display interface can display a task card related to the membership privilege. On the contrary, when it is authenticated that a current user is not the user A, the task card display interface cannot display the task card related to the membership privilege.

Figure 8:
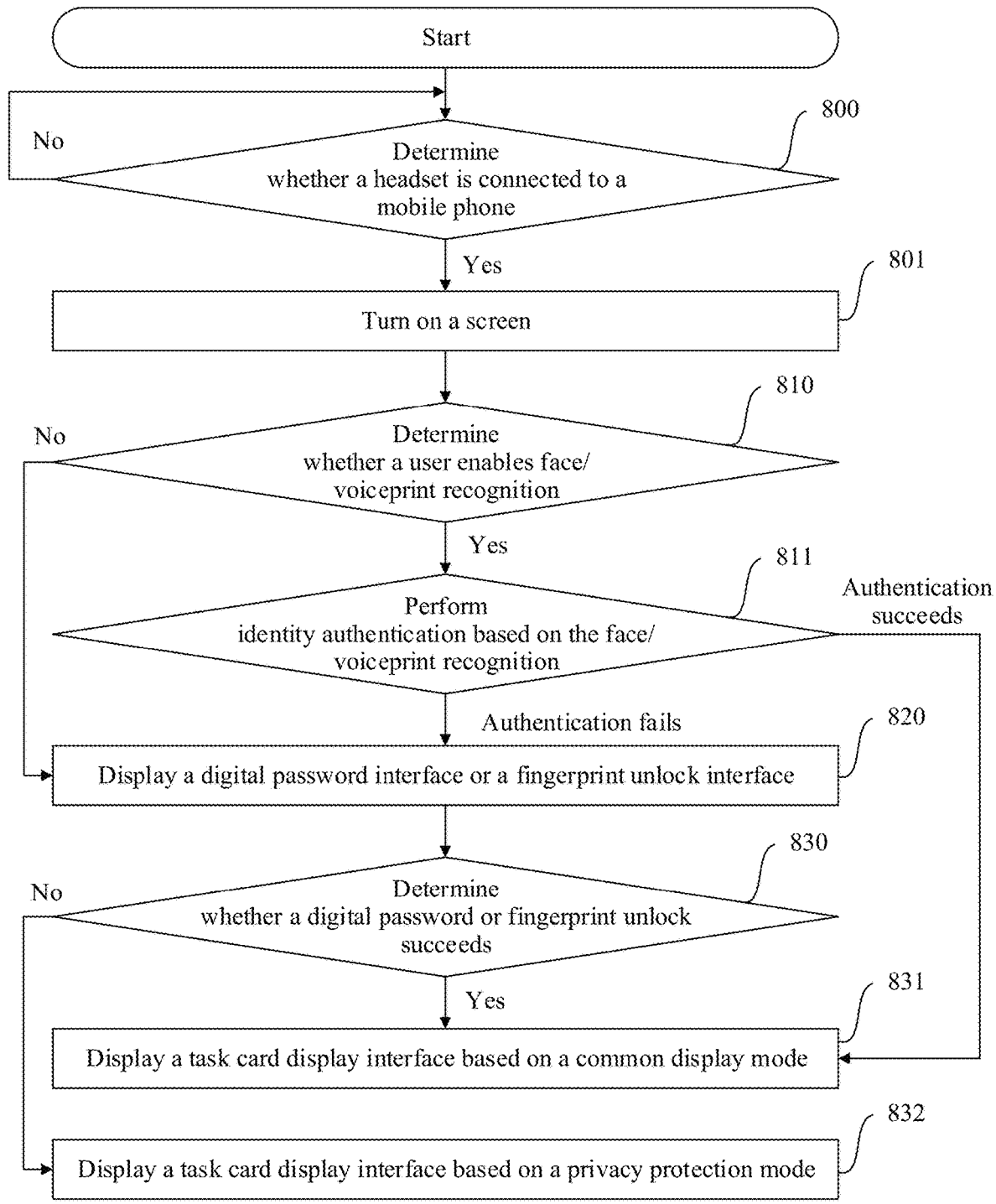
FIG. 8 is a flowchart of a task push method according to an embodiment of this application.

For another example, in an embodiment, the user identity authentication is initiated before the task card display interface is displayed. If the authentication succeeds, the display mode of the task card display interface is set to a common display mode; or if the authentication fails, the display mode of the task card display interface is set to the privacy protection mode. FIG. 8 is a flowchart of a task push method according to an embodiment of this application. As shown in FIG. 8, the following steps are performed.

Step 800: In a screen-locked/screen-off state, determine whether a headset is connected to a mobile phone.

Step 901 is performed when the headset is connected to the mobile phone.

Step 801: Turn on a screen.

Step 810: Determine whether a user enables face/voiceprint recognition.

Step 811 is performed when the user enables the face/voiceprint recognition. Step 811: Perform identity authentication based on the face/voiceprint recognition.

Step 831 is performed when the face/voiceprint recognition succeeds. Step 831: Display a task card display interface based on a common display mode.

Step 820 is performed when the user does not enable the face/voiceprint recognition, or the face/voiceprint recognition fails. Step 820: Display a digital password interface or a fingerprint unlock interface.

Step 830: Determine whether a digital password or fingerprint unlock succeeds.

Step 831 is performed when the digital password or fingerprint unlock succeeds. Step 831: Display the task card display interface based on the common display mode.

Step 832 is performed when the digital password or fingerprint unlock fails. Step 832: Display a task card display interface based on a privacy protection mode.

It may be understood that some or all of the steps or operations in the foregoing embodiments are merely examples. In embodiments of this application, other operations or variations of various operations may be further performed. In addition, the steps may be performed in a sequence different from that presented in the foregoing embodiments, and not all operations in the foregoing embodiments may need to be performed.

Further, according to the task push method provided in embodiments of this application, an embodiment of this application further provides a task push apparatus. In an embodiment of this application, the task push apparatus includes:

a monitoring module, configured to monitor whether an external device is connected to a current device;

a device usage habit description determining module, configured to: when the external device is connected to the current device, determine whether a device usage habit description corresponding to the external device exists, where the device usage habit description is used to describe a usage habit of a user for the external device, and the device usage habit description includes one or more external device tasks corresponding to the external device and application scenario information corresponding to each external device task; and a task card display module, configured to: when the device usage habit description exists, generate a first task card display interface based on the device usage habit description, and display, on the current device, the first task card display interface or an interface used to enter the first task card display interface, where the first task card display interface is used to display a task card of the external device task that is in the device usage habit description and that corresponds to application scenario information that has a highest degree of matching with application scenario information of a current application scenario; or the first task card display interface is used to display task cards of a plurality of external device tasks in the device usage habit description, where the plurality of task cards are sorted based on application scenario matching degrees corresponding to the task cards, and the application scenario matching degree is used to describe a matching degree between application scenario information of a current application scenario and the application scenario information corresponding to the external device task in the device usage habit description.

Further, in the 1990s, an improvement in a technology may be clearly classified into a hardware improvement (for example, an improvement in a circuit structure such as a diode, a transistor, or a switch) or a software improvement (an improvement in a method process). However, with development of technologies, improvements in many method processes today can be considered as direct improvements in hardware circuit structures. Design personnel almost all obtain a corresponding hardware circuit structure by programming an improved method process to a hardware circuit. Therefore, it cannot be said that an improvement in a method process cannot be implemented by a hardware entity module. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming the device. The design personnel program to "integrate" a digital apparatus into one PLD without a need for a chip manufacturer to design and manufacture an application-specific integrated circuit chip. In addition, today, instead of manually making an integrated circuit chip, such programming is also mostly implemented by using "logic compiler (logic compiler)" software. The "logic compiler" software is similar to a software compiler used during program development and writing, and original code to be compiled is also written in a specific programming language that is referred to as a hardware description language (Hardware Description Language, HDL). The HDL does not have merely one type, but has a plurality of types, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most commonly used currently. A person skilled in the art should also be aware that, a hardware circuit that implements a logic method process can be easily obtained provided that logic programming is slightly performed on the method process by using the foregoing several hardware description languages and the method process is programmed into an integrated circuit.

A controller may be implemented in any appropriate manner. For example, the controller may take the form of, for example, a microprocessor or a processor, and a computer-readable medium, a logic gate, a switch, an application-specific integrated circuit (Application-Specific Integrated Circuit, ASIC), a programmable logic controller, and an embedded microcontroller that stores computer-readable program code (such as software or firmware) that can be executed by the (micro) processor. Examples of the controller include but are not limited to the following microcontrollers: ARC 625D, Atmel AT91SAM, Microchip PIC18F26K20, and Silicone Labs C8051F320. A memory controller may also be implemented as a part of a control logic of a memory. A person skilled in the art also knows that, in addition to implementing the controller in a pure computer-readable program code manner, the controller may implement the same function in a form of a logic gate, a switch, an application-specific integrated circuit, a programmable logic controller, an embedded microcontroller, and the like by performing logic programming on the method steps. Therefore, the controller may be considered as a hardware component, and an apparatus that is included in the controller and that is configured to implement various functions may also be considered as a structure in the hardware component. Alternatively, an apparatus configured to implement various functions may be considered as both a software module for implementing a method and a structure in a hardware component.

In the description of embodiments of this application, for ease of description, the apparatus is described by dividing functions into various modules/units. Division into the modules/units is merely logical function division. During implementation of embodiments of this application, the functions of the modules/units may be implemented in a same piece of or a plurality of pieces of software and/or hardware.

Specifically, in an actual implementation, all or some of the apparatuses provided in embodiments of this application may be integrated into one physical entity, or may be physically separated. In addition, all of the modules may be implemented in a form of software invoked by using a processing element or may be implemented in a form of hardware. Alternatively, some modules may be implemented in the form of software invoked by using the processing element, and some modules are implemented in the form of hardware. For example, a detection module may be a separately disposed processing element, or may be integrated into a chip of an electronic device for implementation. An implementation of another module is similar to the implementation of the detection module. In addition, all or some of these modules may be integrated together, or may be implemented independently. In an implementation process, steps in the foregoing methods or the foregoing modules can be implemented by using a hardware integrated logical circuit in the processing element or by using instructions in a form of software.

For example, the foregoing modules may be configured as one or more integrated circuits for implementing the foregoing method, for example, one or more application-specific integrated circuits (Application-Specific Integrated Circuit, ASIC), one or more digital signal processors (Digital Signal Processor, DSP), or one or more field programmable gate arrays (Field Programmable Gate Array, FPGA). For another example, these modules may be integrated together and implemented in a form of a system-on-a-chip (System-On-a-Chip, SOC).

A person of ordinary skill in the art may be aware that units and algorithm steps described in embodiments of this application may be implemented by electronic hardware, or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus, module, and unit, refer to a corresponding process in the foregoing method embodiments. Details are not described herein again.

Embodiments in this application are all described in a progressive manner, for same or similar parts in embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment.

An embodiment of this application further provides an electronic device. The electronic device includes a memory configured to store computer program instructions and a processor configured to execute the program instructions, and when the computer program instructions are executed by the processor, the electronic device is triggered to perform the method steps described in embodiments of this application.

Specifically, in an embodiment of this application, the one or more computer programs are stored in the memory, the one or more computer programs include instructions, and when the instructions are executed by the device, the device is enabled to perform the method steps in embodiments of this application.

Specifically, in an embodiment of this application, the processor of the electronic device may be a system-on-a-chip SOC, and the processor may include a central processing unit (Central Processing Unit, CPU), or may further include a processor of another type. Specifically, in an embodiment of this application, the processor of the electronic device may be a PWM control chip.

Specifically, in an embodiment of this application, the processor may include, for example, a CPU, a DSP, a microcontroller, or a digital signal processor, and may further include a GPU, an embedded neural-network processing unit (Neural-network Processing Unit, NPU), and an image signal processor (Image Signal Processor, ISP). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in a storage medium.

Specifically, in an embodiment of this application, the memory of the electronic device may be a read-only memory (read-only memory, ROM) or another type of static storage device that can store static information and instructions, or a random access memory (random access memory, RAM) or another type of dynamic storage device that can store information and instructions. The memory may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any computer-readable medium that can be used to carry or store expected program code in a form of an instruction or a data structure and that can be accessed by a computer.

Specifically, in an embodiment of this application, the processor and the memory may be integrated into one processing apparatus, and more commonly, are components independent of each other. The processor is configured to execute program code stored in the memory to implement the method in embodiments of this application. In a specific implementation, the memory may alternatively be integrated into the processor, or independent of the processor.

Further, the device, the apparatus, the modules, or the units described in embodiments of this application may be specifically implemented by a computer chip or an entity, or may be implemented by a product having a function.

A person skilled in the art should understand that embodiments of this application may be provided as a method, an apparatus, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media that include computer-usable program code.

In embodiments of this application, when any of the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application.

Specifically, an embodiment of this application further provides a computer-readable storage medium. The computer-readable storage medium stores a computer program, and when the computer program is run on a computer, the computer is enabled to perform the method provided in embodiments of this application.

An embodiment of this application further provides a computer program product. The computer program product includes a computer program. When the computer program is run on a computer, the computer is enabled to perform the method provided in embodiments of this application.

Embodiments of this application are described with reference to the flowcharts and/or block diagrams of the method, the device (apparatus), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

This application can be described in the general context of executable computer instructions executed by a computer, for example, a program module. Generally, the program module includes a routine, program, object, component, data structure, and the like for executing a particular task or implementing a particular abstract data type. This application may be practiced in distributed computing environments in which tasks are performed by remote processing devices that are connected through a communications network. In a distributed computing environment, the program module may be located in both local and remote computer storage media including storage devices.

It should be noted that, in embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. A character "/" generally indicates an "or" relationship between associated objects. At least one of the following items and a similar expression thereof refer to any combination of these items, including any combination of singular items or plural items. For example, at least one item of a, b, or c may indicate a, b, c, a and b, a and c, b and c, or a, b, and c, where a, b, and c may be singular or plural.

In embodiments of this application, a term "include" or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A task push method, comprising:
monitoring whether an external device is connected to a current device;
when the external device is connected to the current device, determining whether a device usage habit description corresponding to the external device exists, wherein the device usage habit description is used to describe a usage habit of a user for the external device, and the device usage habit description comprises one or more external device tasks corresponding to the external device and application scenario information corresponding to the external device task; and
when the device usage habit description exists, generating a first task card display interface based on the device usage habit description, and displaying, on the current device, the first task card display interface or an interface used to enter the first task card display interface, wherein
the first task card display interface is used to display a task card of a first external device task in the device usage habit description, wherein the first external device task is an external device task corresponding to application scenario information that has a highest degree of matching with application scenario information of a current application scenario: or
the first task card display interface is used to display task cards of a plurality of external device tasks in the device usage habit description, wherein the plurality of task cards are sorted based on application scenario matching degrees corresponding to the task cards, and the application scenario matching degree is used to describe a matching degree between application scenario information of a current application scenario and the application scenario information in the device usage habit description.

2. The method according to claim 1, wherein the method further comprises:
when the device usage habit description does not exist, determining whether the current device has executed, within a preset historical time period, external device tasks corresponding to the external device; and
when the current device has executed, within the preset historical time period, the external device tasks corresponding to the external device, generating a second task card display interface, and displaying, on the current device, the second task card display interface or an interface used to enter the second task card display interface, wherein
the second task card display interface is used to display task cards of the external device tasks that correspond to the external device and that have been executed by the current device within the preset historical time period.

3. The method according to claim 2, wherein in the second task card display interface, the task cards are sorted based on historical execution time and/or historical execution frequencies of the external device tasks corresponding to the task cards.

4. The method according to claim 2, wherein the method further comprises:
when the current device has not executed, within the preset historical time period, the external device tasks corresponding to the external device, generating a third task card display interface, and displaying, on the current device, the third task card display interface or an interface used to enter the third task card display interface, wherein the third task card display interface is used to display task cards of tasks of a same type as the external device tasks that correspond to the external device and that have been executed by the current device.

5. The method according to claim 4, wherein in the third task card display interface, the task cards are sorted based on historical execution time and/or historical execution frequencies of the tasks of the same type as the external device tasks corresponding to the task cards.

6. The method according to claim 1, wherein the external device tasks corresponding to the external device comprise:
   invoking, by an application installed on the current device, a task executed by the external device; and/or
   invoking, by an application installed on another device connected to the current device, a task executed by the external device.

7. The method according to claim 1, wherein the displaying, on the current device, the task card display interface or an interface used to enter the task card display interface comprises:
   ending a screen-locked/screen-off state, and displaying the task card display interface on the current device, when the current device is in the screen-locked/screen-off state; and/or
   displaying the interface on a current display interface of the current device when the current device is in an in-use state.

8. The method according to claim 7, wherein the ending a screen-locked/screen-off state, and displaying the task card display interface on the current device, when the current device is in the screen-locked/screen-off state comprises:
   initiating user identity authentication; and
   displaying the task card display interface on the current device when the user identity authentication succeeds.

9. The method according to claim 7, wherein the displaying the interface on a current display interface of the current device when the current device is in an in-use state comprises:
   displaying, on the current display interface of the current device, a floating button used as the interface; and
   displaying the task card display interface on the current device when the user taps the floating button.

10. The method according to claim 1, wherein in the step of displaying, on the current device, the task card display interface or an interface used to enter the task card display interface, a display mode of the task card display interface comprises:
    a common display mode, wherein in the common display mode, display content of the task card display interface comprises content related to personal information of the user; and
    a privacy protection mode, wherein in the privacy protection mode, display content of the task card display interface does not comprise content related to personal information of the user.

11. The method according to claim 10, wherein
    the display mode of the task card display interface is preset on the current device: or
    the display mode of the task card display interface corresponds to a user identity of a user who uses the current device.

12. An electronic device, wherein the electronic device comprises a memory configured to store computer program instructions and a processor configured to execute the program instructions, and when the computer program instructions are executed by the processor, the electronic device is triggered to perform;
    monitoring whether an external device is connected to a current device;
    when the external device is connected to the current device, determining whether a device usage habit description corresponding to the external device exists, wherein the device usage habit description is used to describe a usage habit of a user for the external device, and the device usage habit description comprises one or more external device tasks corresponding to the external device and application scenario information corresponding to the external device task; and
    when the device usage habit description exists, generating a first task card display interface based on the device usage habit description, and displaying, on the current device, the first task card display interface or an interface used to enter the first task card display interface, wherein
    the first task card display interface is used to display a task card of a first external device task in the device usage habit description, wherein the first external device task is an external device task corresponding to application scenario information that has a highest degree of matching with application scenario information of a current application scenario; or
    the first task card display interface is used to display task cards of a plurality of external device tasks in the device usage habit description, wherein the plurality of task cards are sorted based on application scenario matching degrees corresponding to the task cards, and the application scenario matching degree is used to describe a matching degree between application scenario information of a current application scenario and the application scenario information in the device usage habit description.

13. A non-transitory computer-readable storage medium, wherein the computer-readable storage medium stores a computer program, and when the computer program is run on a computer, the computer is enabled to perform;
    monitoring whether an external device is connected to a current device;
    when the external device is connected to the current device, determining whether a device usage habit description corresponding to the external device exists, wherein the device usage habit description is used to describe a usage habit of a user for the external device, and the device usage habit description comprises one or more external device tasks corresponding to the external device and application scenario information corresponding to the external device task; and
    when the device usage habit description exists, generating a first task card display interface based on the device usage habit description, and displaying, on the current device, the first task card display interface or an interface used to enter the first task card display interface, wherein
    the first task card display interface is used to display a task card of a first external device task in the device usage habit description, wherein the first external device task is an external device task corresponding to application scenario information that has a highest degree of matching with application scenario information of a current application scenario; or the first task card display interface is used to display task cards of a plurality of external device tasks in the device usage habit description, wherein the plurality of task cards are sorted based on application scenario matching degrees corresponding to the task cards, and the application scenario matching degree is used to describe a matching degree between application scenario information of a current application scenario and the application scenario information in the device usage habit description.

14. The electronic device according to claim 12, wherein triggered further to perform:
   when the device usage habit description does not exist, determining whether the current device has executed, within a preset historical time period, external device tasks corresponding to the external device; and
   when the current device has executed, within the preset historical time period, the external device tasks corresponding to the external device, generating a second task card display interface, and displaying, on the current device, the second task card display interface or an interface used to enter the second task card display interface, wherein
   the second task card display interface is used to display task cards of the external device tasks that correspond to the external device and that have been executed by the current device within the preset historical time period.

15. The electronic device according to claim 14, wherein in the second task card display interface, the task cards are sorted based on historical execution time and/or historical execution frequencies of the external device tasks corresponding to the task cards.

16. The electronic device according to claim 14, wherein triggered further to perform:
   when the current device has not executed, within the preset historical time period, the external device tasks corresponding to the external device, generating a third task card display interface, and displaying, on the current device, the third task card display interface or an interface used to enter the third task card display interface, wherein the third task card display interface is used to display task cards of tasks of a same type as the external device tasks that correspond to the external device and that have been executed by the current device.

17. The electronic device according to claim 16, wherein in the third task card display interface, the task cards are sorted based on historical execution time and/or historical execution frequencies of the tasks of the same type as the external device tasks corresponding to the task cards.

18. The electronic device according to claim 12, wherein the external device tasks corresponding to the external device comprise:
   invoking, by an application installed on the current device, a task executed by the external device; and/or
   invoking, by an application installed on another device connected to the current device, a task executed by the external device.

19. The electronic device according to claim 12, wherein triggered further to perform:
   ending a screen-locked/screen-off state, and displaying the task card display interface on the current device, when the current device is in the screen-locked/screen-off state; and/or
   displaying the interface on a current display interface of the current device when the current device is in an in-use state.

20. The electronic device according to claim 12, wherein in the step of displaying, on the current device, the task card display interface or an interface used to enter the task card display interface, a display mode of the task card display interface comprises:
   a common display mode, wherein in the common display mode, display content of the task card display interface comprises content related to personal information of the user; and
   a privacy protection mode, wherein in the privacy protection mode, display content of the task card display interface does not comprise content related to personal information of the user.

* * * * *

UNITED STATES PATENT AND TRADEMARK OFFICE
CERTIFICATE OF CORRECTION

Page 1 of 1

PATENT NO. : 12,197,305 B2
APPLICATION NO. : 18/003879
DATED : January 14, 2025
INVENTOR(S) : Yanan Zhang It is certified that error appears in the above-identified patent and that said Letters Patent is hereby corrected as shown below:

In the Claims

Claim 1: Column 22, Line 29: "current application scenario: or" should read as -- current application scenario; or --.

Claim 11: Column 23, Line 62: "preset on the current device: or" should read as -- preset on the current device; or --.

Claim 12: Column 24, Line 4: "triggered to perform;" should read as -- triggered to perform: --.

Claim 13: Column 24, Line 42: "on a computer, the computer is enabled to perform;" should read as -- on a computer, the computer is enabled to perform: --.

Signed and Sealed this
Twenty-fourth Day of June, 2025

Coke Morgan Stewart
*Acting Director of the United States Patent and Trademark Office*